(12) United States Patent
Greenwood et al.

(10) Patent No.: US 10,564,870 B1
(45) Date of Patent: Feb. 18, 2020

(54) PLACING DATA STORAGE VOLUMES

(71) Applicant: Amazon Technologies, Inc., Reno, NV (US)

(72) Inventors: Christopher Magee Greenwood, Seattle, WA (US); Gary Michael Herndon, Jr., Seattle, WA (US); Surya Prakash Dhoolam, Seattle, WA (US); Mitchell Gannon Flaherty, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 215 days.

(21) Appl. No.: 15/058,860

(22) Filed: Mar. 2, 2016

(51) Int. Cl.
*G06F 3/06* (2006.01)
(52) U.S. Cl.
CPC .......... *G06F 3/0631* (2013.01); *G06F 3/0604* (2013.01); *G06F 3/0647* (2013.01); *G06F 3/0673* (2013.01)
(58) Field of Classification Search
CPC .... G06F 3/0631; G06F 3/0604; G06F 3/0647; G06F 3/0673
See application file for complete search history.

(56) References Cited

U.S. PATENT DOCUMENTS

| | | | |
|---|---|---|---|
| 7,529,903 B2* | 5/2009 | Boss | G06F 3/0605 711/165 |
| 2011/0246526 A1* | 10/2011 | Finkelstein | G06F 17/30286 707/784 |
| 2012/0173838 A1* | 7/2012 | Noll | G06F 3/0605 711/170 |
| 2017/0075709 A1* | 3/2017 | Feng | G06F 9/45558 |

OTHER PUBLICATIONS

VMware vSphere 4, ESX and vCenter Server, Thin Provisioning, https://pubs.vmware.com/vsphere-4-esx-vcenter/index.jsp#com.vmware.vsphere.server_configclassic.doc_41/esx_server_config/managing_storage/c_vstorage_thin_provisioning.html (Year: 2012).*
Yuval Shavit, Predicting data storage growth, TechTarget Search ITChannel, May 2008, https://searchitchannel.techtarget.com/feature/Predicting-data-storage-growth (Year: 2008).*

* cited by examiner

*Primary Examiner* — Adam M Queler
*Assistant Examiner* — Edmund H Kwong
(74) *Attorney, Agent, or Firm* — Hogan Lovells US LLP

(57) ABSTRACT

The allocation of resources, such as for data storage, can be performed based at least in part upon predicted values for utilization and growth, among other such values. Various features can be used to predict the initial utilization and growth rate for a data volume, and these predicted values can be used to determine where to place the volumes. The features can include, for example, customer usage history, volume type, volume purpose, type of attached virtual machine, and the like. The ability to predict actual usage can enable capacity to be allocated based on an as-needed basis instead of providing large blocks of allocated capacity that would go largely unused. Similar predictions can be used to determine whether and where to migrate data volumes so as to maintain sufficient capacity across a group of resources.

19 Claims, 10 Drawing Sheets

PLACING DATA STORAGE VOLUMES

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. Multiple users can share resources such as remote servers and data repositories, wherein the users can concurrently send multiple requests to be executed against the same resource. The resources can be physical resources or virtual resources provided through virtualization. In many instances, data volumes for a customer will be placed on resources that have sufficient available capacity. In many instances customers will be allocated more capacity than they use, which results in unused capacity that wastes resources. It is possible to place more volumes on a resource than the capacity allows, since at least some of the allocated capacity will not be used, but conventional approaches risk not being able to meet the allocation for customers when the use patterns change.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the aforementioned and other deficiencies experienced in conventional approaches to managing aspects of resource sharing and allocation in an electronic environment. In particular, various embodiments provide for the placement and movement of data volumes, and other such resource allocations, based upon utilization predictions made for one or more future periods of time. In various embodiments, a data volume will serve input and/or output (I/O) operations for a virtual machine instance, or other such resource, executing on a server in a multi-tenant environment. The data will have some initial size or utilization, and the size or utilization will often change over time. In many cases the utilization will be less than what would otherwise be allocated to the customer, which can result in underutilization of the resources. The volume space can be allocated on the fly based on demand, but this comes with at least some risk of running out of space for one or more volumes.

Accordingly, approaches in accordance with various embodiments can attempt to predict values such as the anticipated utilization and growth over one or more future periods of time in order to place volumes on resources that will have sufficient capacity based on similar predictions for other volumes already placed on those resources. This can include, for example, using at least one prediction model or algorithm that analyzes features such as customer usage history, volume type, virtual machine type, volume purpose, customer capacity limitations, and other such features. Similar predictions can be made to attempt to determine whether to migrate one or more placed data volumes in order to prevent a resource from running out of capacity.

Various other applications, processes, and uses are presented below with respect to the various embodiments.

Figure 1:
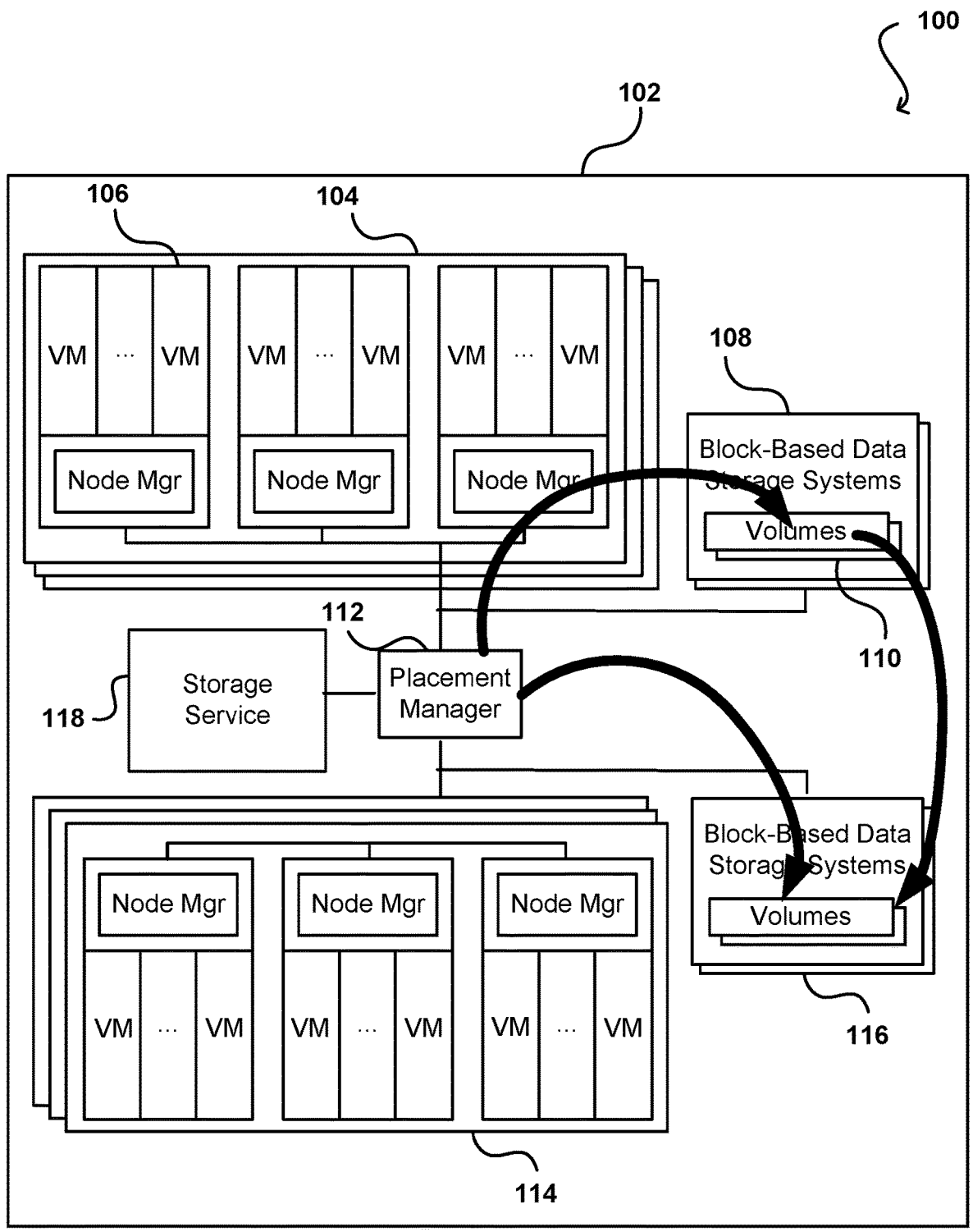
FIG. 1 illustrates an example approach to placing and/or migrating data volumes that can be utilized in accordance with various embodiments.

FIG. 1 illustrates an example network configuration 100 in which data can be stored, and operations performed, in accordance with various embodiments. This configuration can include components offered as part of a multi-tenant environment, or resource provider environment 102, wherein the components are provided by a resource provider, and customers pay for access and/or utilization of respective portions of those resources. In this example configuration, the resource provider environment includes a number of racks 104, each rack including a number of host computing devices 106. The host computing systems 106 each host one or more virtual machines. Each virtual machine can act as an independent resource node for executing one or more program copies or performing another such action or process for user data requests, I/O operations, etc. This example configuration also includes computer systems that execute a block-based data storage system or service. The service can utilize a pool of multiple block-based data storage systems, which each have local block-based storage for use in storing one or more volumes 110. Access to the volume copies 110 is provided over an internal network to programs executing on various resource nodes. Thus, an application executing on a virtual machine instance on one of the computer systems 106 can be connected with one or more storage volumes 110 in the block based data storage systems. This is referred to herein as the instance being "attached" to the storage volume(s).

As illustrated, there is a first set of resources 104, 108 in a first location and a second set of resources 114, 116 in a second location (different logically and/or geographically from the first location). Resources have limited capacity, and if the block based storage systems 108 in one set are full, then additional volumes might have to be stored to block-based storage systems 116 of the other set. Accordingly, approaches in accordance with various embodiments attempt to place and/or relocate (i.e., migrate) data volumes where possible in order to improve performance, cost, and availability. This can include, for example, placing data volumes on a first set of resources and then later moving data volumes to a second set of resources. In some embodiments, data volumes that are detached from current virtual machines and have not been accessed for at least a determined period of time can potentially be snapshotted and moved to a separate storage service 118, for example, such as a Web-based persistent data storage service. The placement and movements can be determined and executed, at least in part, using a placement manager 112 or other such system or service.

In one example, a customer requesting to have a data storage volume allocated for use, as may receive input and/or output (I/O) instructions, will also have a virtual machine instance allocated that will be connected and/or attached to the instance. A volume placed on a server takes up various resources and/or capacity from the server, including bytes, slots, IOPS, and throughput, among others. The IOPS and throughput resources apply for that volume only when there is at least some volume of I/O. An example server might have a capacity of 10,000 IOPS and a volume placed on that server might be configured with 1,000 IOPS. The volume thus could perform up to 1,000 IOPS such that the IOPS need to be allocated on that server for the volume. This leaves only 9,000 remaining IOPS of capacity on the server. If the volume is not actually performing any I/O operations, however, this results in unused capacity as the server could still actually handle 10,000 IOPS. Approaches in various embodiments may not count detached volumes into the IOPS equation, and thus can consider that the server is capable of holding volumes up to 10,000 instead of 9,000 IOPS, which helps to minimize unused capacity, which improves performance and reduces cost. There is a risk to such an approach, however, as the detached volume could be connected and/or attached any time by the customer. If all the volumes on a server get connected and drive at their maximum I/O allocation, the server will not be able to cater to all the demand. To protect against this, various approaches can reserve at least some IOPS for detached volumes, which still results in some unused capacity.

Figure 2:
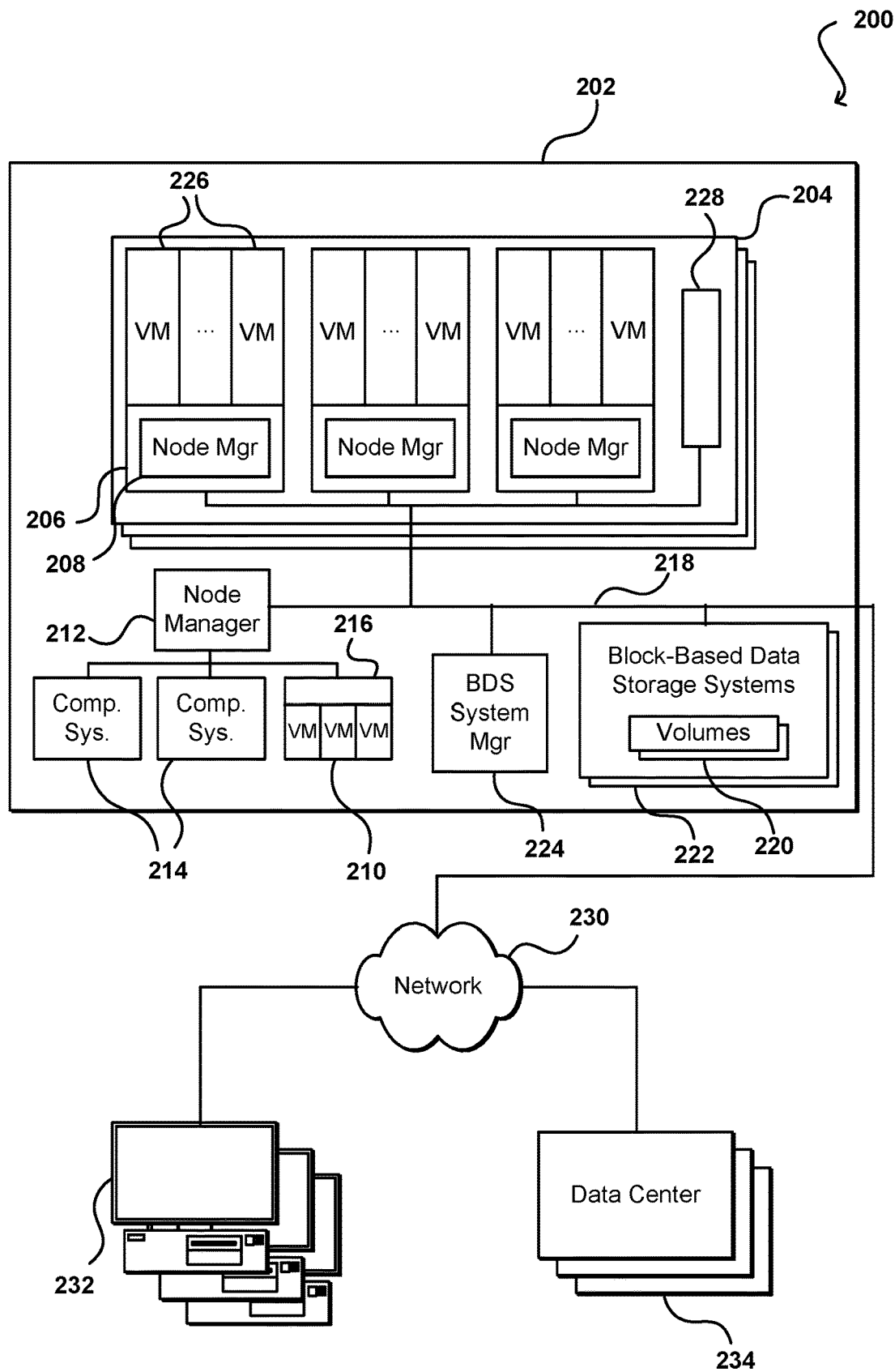
FIG. 2 illustrates an example environment in which aspects of the various embodiments can be implemented.

FIG. 2 illustrates an example network configuration 200 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 202 includes a number of racks 204, each rack including a number of host computing devices 206, as well as an optional rack support computing system 228 in this example embodiment. The host computing systems 206 on the illustrated rack 204 each host one or more virtual machines 226 in this example, as well as a distinct node manager module 212 associated with the virtual machines on that host computing system to manage those virtual machines. One or more other host computing systems 216 may also each host one or more virtual machines 210 in this example. Each virtual machine 210 may act as an independent resource node for executing one or more program copies or performing another such action or process for user data requests, I/O operations, etc. In addition, this example data center 202 further includes additional host computing systems 214 that do not include distinct virtual machines, but may nonetheless each act as a resource node for one or more tasks being executed for a user. In this example, a node manager module 212 executing on a computing system (not shown) distinct from the host computing systems 214 and 216 is associated with those host computing systems to manage the resource nodes provided by those host computing systems, such as in a manner similar to the node manager modules 208 for the host computing systems 206. The rack support computing system 228 may provide various utility services for other computing systems local to its rack 204 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 202 also includes a computing system 224 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 234, or other remote computing systems 232 external to the data center). In particular, in this example the data center 202 includes a pool of multiple block-based data storage systems 222, which each have local block-based storage for use in storing one or more volume copies 220. Access to the volume copies 220 is provided over the internal network(s) 218 to programs executing on various resource nodes 210 and 214. As discussed in greater detail elsewhere, a block-based data storage system manager module 224 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 222 may coordinate with the node manager modules 212, 208 to manage use of volumes by programs executing on associated resource nodes, while in other embodiments the node manager modules may not be used to manage such volume use. In addition, in other embodiments, one or more BDS system manager modules 224 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 222 (e.g., in a peer-to-peer manner, without any separate centralized BDS system manager module on a computing system 224).

In this example, the various host computing systems, server block data storage systems, and computing systems are interconnected via one or more internal networks 218 of the data center, which may include various networking devices (e.g., routers, switches, gateways, etc.) that are not shown. In addition, the internal networks 218 are connected to an external network 230 (e.g., the Internet or another public data network) in this example, and the data center 202 may further include one or more optional devices (not shown) at the interconnect between the data center and an external network (e.g., network proxies, load balancers, network address translation devices, etc.). In this example, the data center 202 is connected via the external network 230 to one or more other data centers 234 that each may include some or all of the computing systems and storage systems illustrated with respect to data center 202, as well as other remote computing systems 232 external to the data center. The other computing systems 232 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the block-based storage systems 222 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 2 has been simplified for the purposes of explanation, and that the number and organization of host computing systems, server block data storage systems and other devices may be much larger than what is depicted in FIG. 2. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, a data center may execute tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 3:
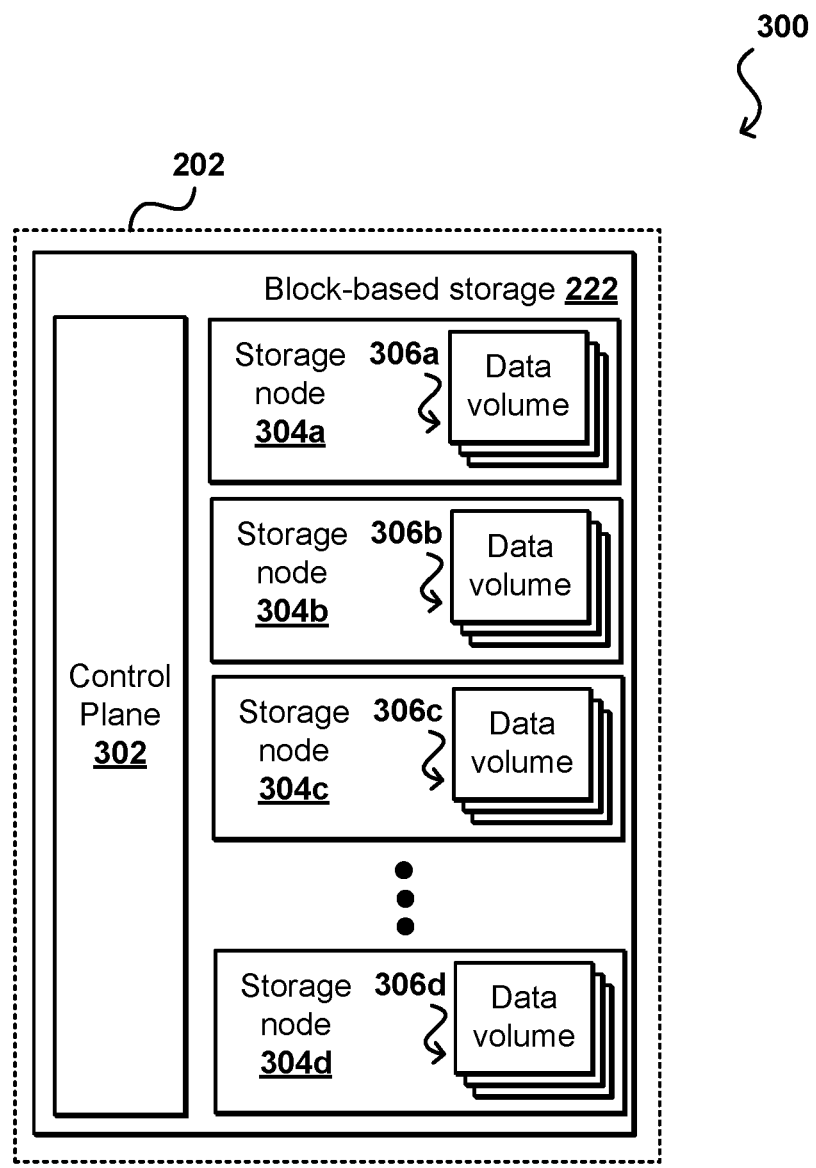
FIG. 3 illustrates components of an example block-based data storage service that can be utilized in accordance with various embodiments.

A block-based storage service provider can implement functionality such as page cache write logging and the dynamic modifying of durability properties for data volumes. FIG. 3 is a block diagram illustrating components of a provider environment 202 such as described with respect to FIG. 2. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, as may include a block-based storage service 222 in at least some embodiments. A provider environment 300, or other such multi-tenant or shared resource environment, may be set up by an entity such as a company or a public sector organization to provide one or more services (such as various types of cloud-based computing or storage) accessible via the Internet and/or other networks to clients. The provider environment 202 may include numerous data centers hosting various resource pools, such as collections of physical and/or virtualized computer servers, storage devices, networking equipment and the like, used to implement and distribute the infrastructure and services offered by the provider environment 202. In some embodiments, the provider environment 202 may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances, that make use of particular data volumes, providing virtual block storage for the compute instances.

In various embodiments, the provider environment 202 implements a block-based storage 222 system or service for performing storage operations. The example block-based storage 222 is a storage system, composed of a pool of multiple independent storage nodes 304a, 304b, 304c through 304n (e.g., server block data storage systems), which provide block level storage for storing one or more sets of data volumes 306a, 306b, 306c, through 306n. The data volumes 306 can be mapped to particular clients, providing virtual block-based storage (e.g., hard disk storage or other persistent storage) as a contiguous set of logical blocks. In some embodiments, a data volume 306 may be divided up into multiple data chunks (including one or more data blocks) for performing other block storage operations, such as snapshot operations or replication operations.

A volume snapshot of a data volume 306 may be a fixed point-in-time representation of the state of the data volume. In some embodiments, volume snapshots may be stored remotely from a storage node 304 maintaining a data volume 306, such as in another storage service. Snapshot operations may be performed to send, copy, and/or otherwise preserve the snapshot of a given data volume in another storage location, such as a remote snapshot data store in another storage service.

A block-based storage service 222 can implement a block-based storage service control plane 302 to assist in the operation of the block-based storage service 222. In various embodiments, the block-based storage service control plane 302 assists in managing the availability of block data storage to clients, such as programs executing on compute instances provided by a virtual compute service and/or other network-based services located within the provider environment 202 and/or optionally computing systems (not shown) located within one or more other data centers, or other computing systems external to the provider network and available over at least one network. Access to the data volumes 306 may be provided over an internal network within the provider network 202 or externally via an appropriate network, in response to block data transaction instructions.

A block-based storage service control plane 302 can provide a variety of services related to providing block level storage functionality, including the management of user accounts (e.g., creation, deletion, billing, collection of payment, etc.). The block-based storage service control plane 302 may further provide services related to the creation, usage and deletion of data volumes 306 in response to configuration or other such requests. The block-based storage service control plane 302 can also provide services related to the creation, usage, and deletion of volume snapshots on another storage service. The block-based storage service control plane 302 may also provide services related to the collection and processing of performance and auditing data related to the use of data volumes 306 and snapshots of those volumes.

The provider environment 202 may also implement other storage services, as noted above. Another storage service may provide a same or different type of storage as provided by the block-based storage service 222. For example, in some embodiments another storage service may provide an object-based storage service, which may store and manage data as data objects. For example, volume snapshots of various data volumes 306 may be stored as snapshot objects for a particular data volume 306. In addition to another storage service, the provider environment 202 may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the network environment 202. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 306, or other network-based service in the provider environment 302 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 306 in a manner that is transparent to applications implemented on the client, utilizing computational resources provided by the compute instance or block storage provided by the data volume 306.

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 4:
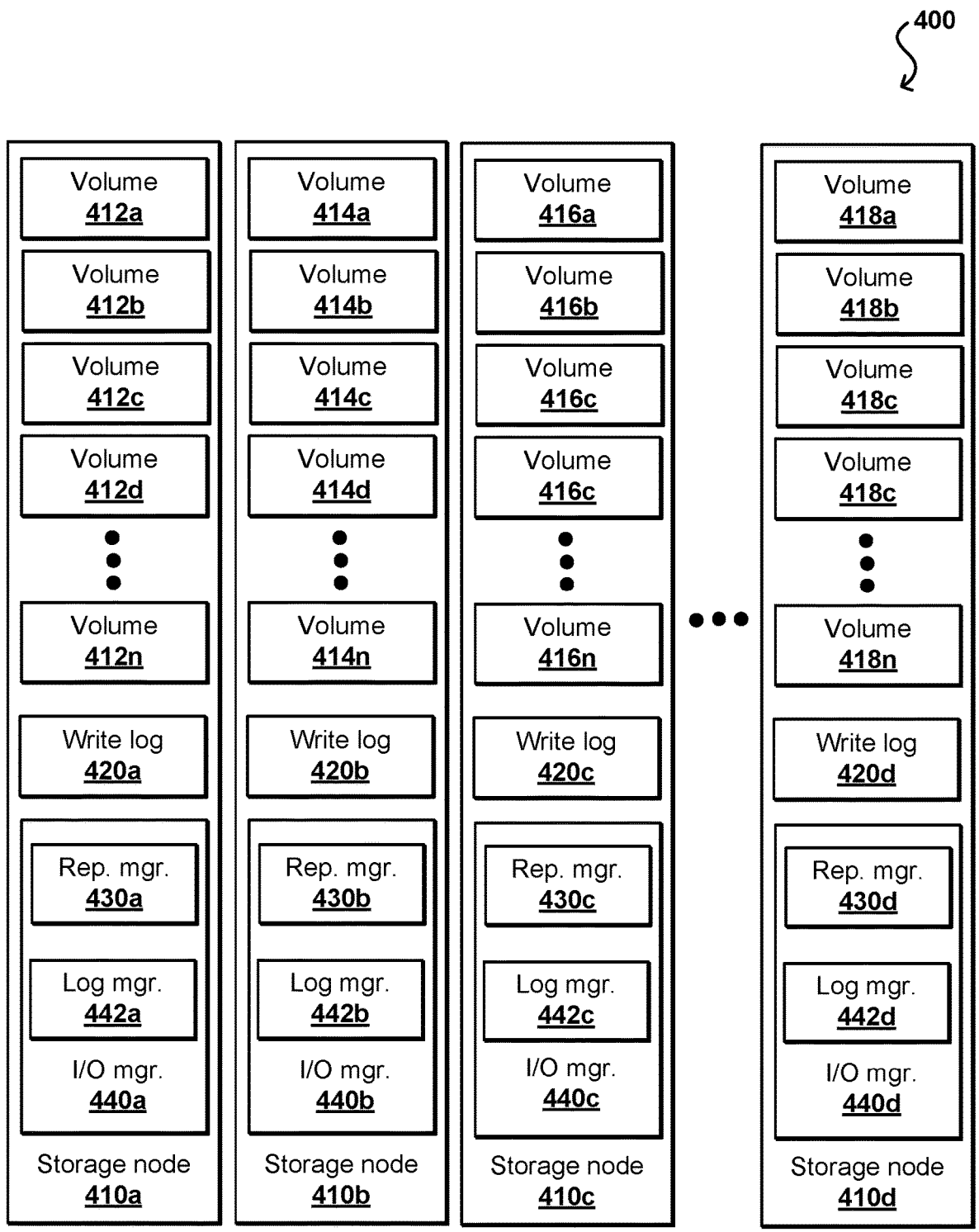
FIG. 4 illustrates a set of storage nodes that can be utilized in accordance with various embodiments.

FIG. 4 is a block diagram 400 illustrating storage nodes that implement write logs for updates to page caches implemented at the storage nodes and dynamically modifying durability properties for data volumes, according to some embodiments. Multiple storage nodes, such as storage nodes 410a, 410b, 410c, through 410n may be implemented in order to provide block-based storage services. A storage node 410 can comprise one or more computing systems or devices, such as a storage server or other such computing system or device. Each storage node 410 can maintain respective replicas of data volumes. For instance, a first storage node 410a maintains a set of data volumes 412, while storage nodes 410b through 410d maintain other data volumes 414, 416, 418, respectively. While the example storage nodes 410 are depicted as having equal numbers of data volumes, numbers of data volumes maintained on storage nodes may vary between storage nodes. Some data volumes may also differ in size from other data volumes, in some embodiments. In addition, some data volumes may be split, or partitioned, into different segments, such that multiple storage nodes, such as storage node 410a and 410b, store different segments of a storage volume. A storage volume may be partitioned into any number of segments. Storage nodes 410 can be used to provide multi-tenant storage. For example, in some embodiments a data volume 416a maintained at a storage node 410c may be maintained for one account of the block-based storage service, while a different data volume 416b also maintained at the same storage node 410c may be maintained for a different account. Storage nodes 410 can persist their respective data volumes in one or more block-based storage devices (e.g., hard disk drives, solid state drives, etc.) that may be directly attached to a computing system or device implementing the respective storage node.

In various embodiments, storage nodes 410 may each implement at least one respective page cache. A page cache can be a portion of system memory or other memory device that stores pages or other groupings of data from one of the data volumes 412 maintained a respective storage node 410. Instead of directly writing to or reading from a block-based storage device maintaining the portion of requested data of a data volume, the page cache may be updated. For example, if a read request is received for a portion of a data volume, it may first be determined whether the data resides in the page cache. If the data resides in the page cache then the data may be read from cache. If not, the data may be retrieved from the respective block-based storage device maintaining the portion of the requested data of the data volume and written into the page cache for future use. Similarly, a write request may be directed toward a data volume maintained in persistent block storage may be first completed at the page cache. For a received write request, a page cache entry corresponding to the data to be written (e.g., a portion of a data volume already maintained in the page cache) may be updated according to the write request. Similarly, if the data to be modified by the write request is not in the page cache, the data may be first obtained from the block-based storage device that persists the data, written into a new page cache entry in the page cache, and then updated according to the write request. Page cache techniques are well-known to those of ordinary skill in the art, and thus, the previous examples are not intended to be limiting as to other page cache techniques.

In various embodiments, the storage nodes 410 can implement respective write logs 420. Write logs, for example page cache write logs, may store log records describing updates to the respective page cache, such as write requests that modify data maintained in a page cache. Thus, in the event of a system or other failure that causes a loss of data in the page cache, log records in the write log 420 can be used to restore the page cache to a state prior to the failure. Log records may be stored sequentially according to the order in which updates are made to page cache, in some embodiments. By storing log records sequentially, log records may be replayed or re-applied in the order in which they are stored to generate a state of the page cache at a particular point in time. The storage nodes 410 can also implement respective input/output ("I/O") managers 440. The I/O managers 440 may handle I/O requests directed toward data volumes maintained at a particular storage node. Thus, an I/O manager 440b can process and handle a write request to a volume 414b at a particular storage node 410b, for example. An I/O manager 440 can be configured to process I/O requests according to block-based storage service application programming interface (API) and/or other communication protocol(s), such as such as the Internet small computer system interface (iSCSI) protocol. In some embodiments, I/O managers 440 implement respective log management components 442 and replication management components 430. The log management components can perform various log management functions, such as trimming log records and/or performing page cache recovery based, at least in part, on log records. The replication management components can perform various tasks, as discussed herein, related to volume replication.

A block-based storage service can manage and maintain data volumes in a variety of different ways. Different durability schemes may be implemented for some data volumes among two or more storage nodes maintaining a same replica of a data volume. For example, different types of mirroring and/or replication techniques may be implemented (e.g., RAID 1) to increase the durability of a data volume, such as by eliminating a single point of failure for a data volume. In order to provide access to a data volume, storage nodes may then coordinate I/O requests, such as write requests, among the two or more storage nodes maintaining a replica of a data volume. For example, for a given data volume 412a, a storage node 410a may serve as a master storage node. A master storage node may, in various embodiments, receive and process requests (e.g., I/O requests) from clients of the data volume. Thus, storage node 410a may then coordinate replication of the I/O requests, such as write requests, or any other changes or modifications to the data volume 412a to one or more other storage nodes serving as slave storage nodes. For instance, a storage node 410c may maintain a data volume 416d which is a replica of another data volume 412a. Thus, when a write request is received for the data volume 412a at the master storage node 410a, the master storage node 410a can be configured to forward the write request to the slave storage node 410c and wait until the slave storage node 410c acknowledges the write request as complete before completing the write request at the storage node 410. Master storage nodes may direct other operations for data volumes, like snapshot operations or other I/O operations (e.g., serving a read request). It should be noted that, in some embodiments, the role of master and slave storage nodes may be assigned per data volume. For example, for a data volume 412a maintained at a first storage node 410a, that first storage node 410a may serve as a master storage node. While for another data volume, such as data volume 412b, maintained at storage node 410a, the storage node 410a may serve as a slave storage node.

In some embodiments, data volumes are replicated with two copies. A replication protocol can be used that can make both copies of a volume deterministically consistent, and that is agnostic to features on the server that use replication for durability like snapshots. This can greatly simplify the replication protocol itself since there can be fewer custom messages, and can allow various other distributed features to be built on a server using replication without ever having to touch the replication protocol.

In various embodiments, data storage volumes can be presented as block devices to customers, addressable via read/write requests using an offset, length, and data. As mentioned, the data volume can be stored on a server as a type of persistent key-value store. In some embodiments, the storage on a server can be divided into portions, such as a log partition and a data partition. The log partition can consist of one or more devices, such as fast solid state drives (SSDs), with an appropriate log interface. The data partition can consist of a logical striping across a number of SSDs or magnetic drives, for example, and can present a block interface that can be written to randomly in at least some embodiments. There can be one log and one data partition per server. It at least some embodiments the writes first go to the log and then can later be written to the data partition.

A note for a customer write operation can contain information such as the offset for the write, the length, the operation number, and the data itself. The volume can map this to a key, value, data-reference store using an appropriate schema. One such schema includes a volume key, which can be a prefix to distinguish customer data, customer offset, and operation number. The schema can also include a volume value, which can refer to the data length, and a volume data reference, which can be a pointer to the location of the data. The volume storage engine can also support flushing of the data from the log to the appropriate data partition. Notes for customer writes include the data, such that all incoming writes can be written to the log. To free up space in the log, the storage server can periodically read the data reference and the associated data, write that data to the data partition, and replace the data reference with a pointer to a location on the data partition instead of the log. This enables that data to be removed from the log. This flushing can be performed done asynchronously, enabling multiple customer writes to be merged together.

As mentioned, in many instances it will be desirable to replicate various data volumes. A replication process can be responsible for ensuring that both copies of the volume are the same and that all changes are applied in the same order on each copy. The replication techniques discussed herein track these updates as operations. The operations can include, for example, customer writes and metadata updates such as volume provisioned input/output operations per second (IOPS), volume leases, and snapshot metadata. Each operation in at least some embodiments will have an ever-increasing operation number assigned, and the volume can be uniquely described by the sequence of operations. The replication process can guarantee that both copies have the same sequence of operations and will be executed in the same order.

Figure 5:
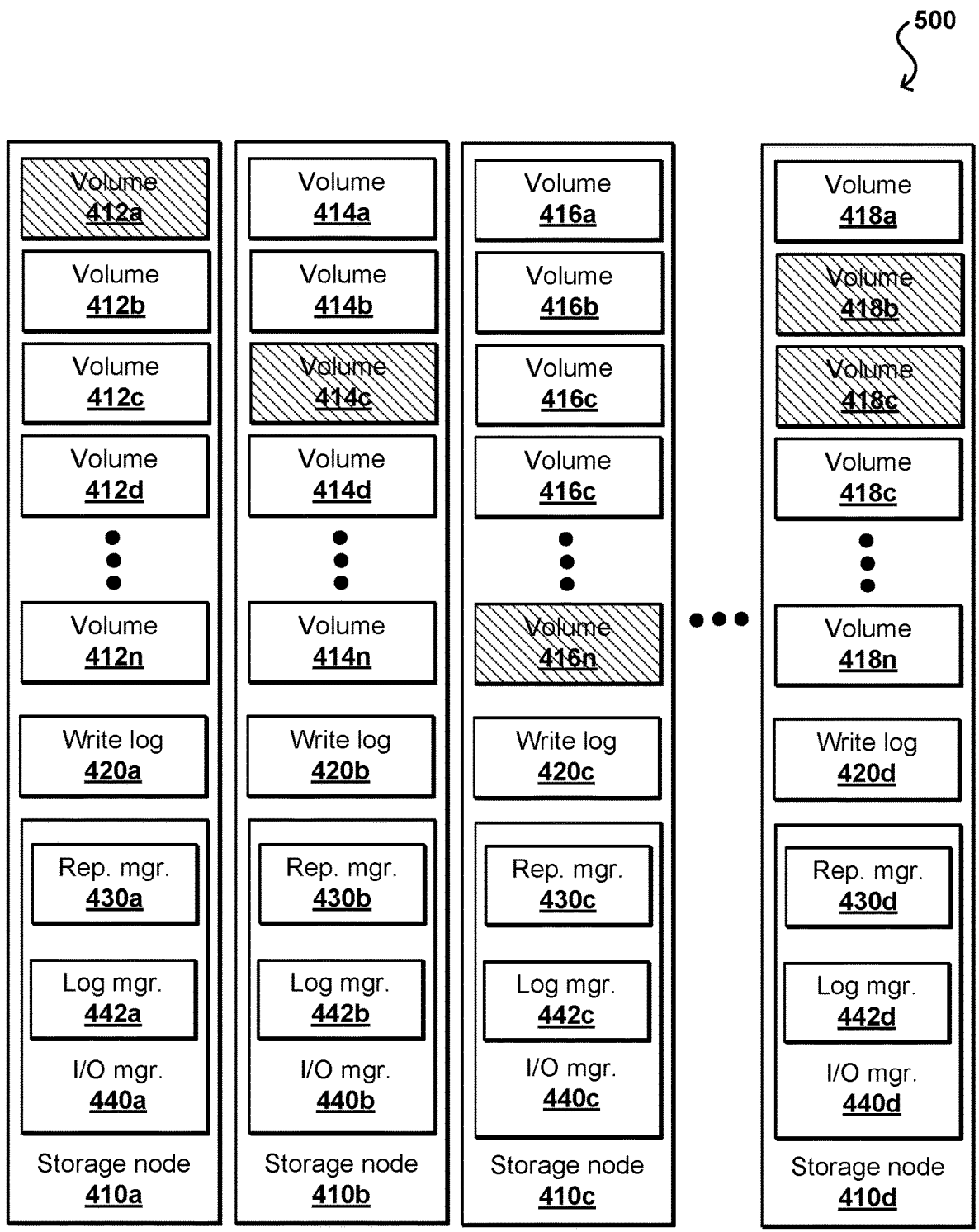
FIG. 5 illustrates a set of storage nodes where some of the volumes hosted by those nodes are not attached or connected to an active virtual machine instance that can be utilized in accordance with various embodiments.

FIG. 5 illustrates another view 500 of a set of storage nodes 500 that can be utilized in accordance with various embodiments. In this example, there are a number of data volumes that are not attached to servers (or other such components) in the resource provider environment, and thus are currently unable to serve I/O for those servers. These volumes 412a, 414c, 416n, 418b, 418c are represented by the patterned boxes in the figure. As mentioned, these volumes could potentially be re-attached to a server such that they could serve I/O, and thus count against the available capacity on the various nodes. In this example, the nodes are all connected (persistently) to a network locality with shared state and interconnect, such that these detached volumes are taking up capacity that could more advantageously be allocated to data volumes attached to servers of the network locality, which could improve performance and reduce cost. Thus, it can be desirable in at least some embodiments to move these detached data volumes, or at least one of a replicated data volume pair, to a different location in the resource provider environment. As mentioned, this can include another network locality that has available capacity and/or less demand, or to a separate storage service or facility, among other such options. In at least some embodiments a resource localization algorithm can be used that attempts to maximize the number of connected components that are contained within the same network locality, such as by determining requirements and connections and moving components between localities as appropriate.

In some such systems, virtual data stores may be provisioned in a "thin" or "sparse" manner by virtual data storage services in a manner that controls risk of implementation resource shortages, for example, due to sudden spikes in demand. Customers of a virtual data storage service in accordance with at least one embodiment may request that a virtual data storage service provision data stores of various sizes. The virtual data storage service may assess the requests with respect to various utilization metrics and, for at least some of the requests, may determine that the associated data store may be allocated initial implementation resources (e.g., hard drive disk space) that maintain a data storage space of a size less than the requested size.

Relationships (e.g., ratios) between requested data storage space size, data storage server capacity, allocated data storage space size and/or allocated data storage space utilization may be tracked on a per data store, per customer, per data storage server, and/or a per virtual data storage service basis. For each such basis, a set of constraints ("sparse provisioning constraints") may be specified to control the relationships. Such control may reduce a risk that a sudden spike in activity (e.g., writes of data to previously unwritten portions of a data storage space) results in a performance degradation while additional implementation resources are made available. The set of constraints may be enforced during implementation resource allocation and/or re-allocation (collectively, "allocation"), and by migration of data storage space portions to different implementation resources as part of a sparse provisioning load balancing.

Various activity (e.g., rates of data consumption, rates of data change) with respect to data storage spaces may be monitored, and implementation resource allocations adjusted in accordance. As well as distinctions between active and inactive portions of a data storage space (i.e., between portions of the data storage space written at least once and not written since provisioning, respectively), access and/or update frequencies of data in active portions of the data storage space (the "active storage space") may be tracked. Hot and cold regions of the active storage space (i.e., frequently and infrequently accessed and/or updated regions, respectively) may be identified, and cold regions may be transferred to lower performance and/or lower cost implementation resources.

Provisioning details may be made explicit to virtual data storage service customers to varying degrees including explicit, aggregate on a per customer basis, and aggregate on a per virtual data storage service basis. A customer may be presented with an explicit inventory of portions of a provisioned virtual data store that are unallocated, inactive, active, hot and/or cold, and the customer's cost plan may specify different costs associated with each status. Alternatively, the customer may be presented with various representative provisioning metrics for one or more sets of virtual data store provisioned by the customer such as "percent active," and the customer's cost plan may apply various provisioning discounts (e.g., corresponding to provisioning metric thresholds) when such provisioning is authorized by the customer. As a further alternative, the virtual data storage service operator may incorporate provisioning cost efficiencies into pricing of the service as a whole.

As part of provisioning a virtual data store, a provisioning interface and/or workflow component may request that a data storage space allocation component determine the appropriate set of implementation resources required to implement the virtual data store, determine whether the required implementation resources are available and/or satisfy an associated set of provisioning constraints, and/or allocate the required implementation resources. The data storage space allocation component may incorporate any suitable data storage space allocation and/or resource scheduling algorithm. Such algorithms are well known to those of skill in art, and need not be described here in detail.

The provisioning constraints may include any suitable provisioning constraint. Examples of suitable provisioning constraints include constraints with respect to data store utilization metrics including metrics aggregated with respect to customer, customer type, virtual data store type, implementation resource type, and/or the virtual data storage service, constraints based at least in part on virtual data store type and/or implementation resource type, constraints with respect to requested data storage space size, data store server capacity, allocated data storage space size, and suitable ratios and/or combinations thereof. Provisioning constraints may include any suitable conditions such as compound conditions specified with Boolean operators and conditions specifying that particular numbers, levels, ratios and/or proportions are above a minimum value, below a maximum value and/or within a specified range of values.

Data store utilization metrics may include any suitable utilization metrics for the virtual data stores and/or their associated data storage spaces allocated at the sets of data storage servers. Examples of suitable utilization metrics include amounts of active, inactive, hot and/or cold data storage space, and/or rates of change thereof. Such amounts may be proportions and/or ratios relative to one another and/or to requested virtual data store size. A rate of consumption of a particular virtual data store may correspond to a rate of decrease in an amount of inactive data storage space in the virtual data store. Virtual data stores may be implemented by multiple data storage servers. Particular data storage servers may participate in the implementation of multiple virtual data stores. Further examples of suitable utilization metrics include virtual data store and/or allocated data storage space metrics aggregated with respect to particular data storage servers. Data store utilization metrics can include ratios of requested storage space (i.e., for one or more of the virtual data stores) to allocated storage space (i.e., at one or more of the data storage servers) for each of the virtual data stores, the data storage servers, associated data storage spaces and/or sets (including all) thereof. Alternatively, or in addition, the data store utilization metrics may include ratios of available storage space (e.g., maximum available storage space at a particular data storage server and/or a capacity of the data storage server), allocated storage space, and/or active storage space to requested storage space, allocated storage space and/or active storage space. When the data store utilization metrics correspond to sets and/or aggregates, they may be statistical representations such as averages.

The data storage space allocation component may include an activity monitor configured at least to monitor the virtual data stores, the implementation resources and/or allocated data storage spaces to collect information sufficient to determine the data store utilization metrics. The data storage space allocation component may further include an activity classification component configured at least to analyze the information collected by the activity monitor to detect virtual data store, implementation resource and/or allocated data storage space utilization patterns correlated with types of activity class (e.g., customer activity class, data storage server activity class). For example, particular utilization patterns may correspond to low, standard, or high activity, and the sparse provisioning constraints may include constraints referencing such activity classes.

The cost tracking component may maintain a cost tracking account for each customer of the virtual data store service. Utilization and/or costs associated with virtual data stores provisioned by a customer, and/or associated implementation resources, may be recorded in the customer's account. The cost tracking component may maintain one or more cost plans specifying how the costs are allocated to the customer's account. The cost tracking component may include an account user interface (UI) component configured at least to provide the customer with one or more presentations of the utilization and/or costs recorded in the customer's account and, when one or more of the costs correspond to a financial balance owed to the virtual data store service, one or more mechanisms for settling the account balance (e.g., payment instrument processing). The account UI may further provide for account creation, account configuration and reconfiguration, account details viewing and updating, as well as account deletion. Account (re)configuration may include selection from a qualified list of cost plans when multiple such cost plans are available.

Using a previous approach, a provisioning request may be received from a customer of the virtual data storage service. For example, a request for a 2.0 Terabyte volume of a specific type of file system may be received at an appropriate provisioning interface. A utilization ratio may be determined, such as by a data storage space allocation component determining a data store utilization ratio corresponding to the customer that sent the provisioning request. The data store utilization ratio may be a fixed ratio specified for customers of the virtual data storage service. Alternatively, the customer data store utilization ratio may be a utilization ratio determined for the requesting customer based on data store utilization metrics associated with provisioned virtual data stores of the customer and/or a subset of the customers of the virtual data storage service. For example, the data storage space allocation component may determine that the requesting customer has an historical volume utilization ratio of 40%. As another alternative, the data store utilization ratio may be a fixed ratio specified for a type of customer including the customer, for example, as determined by the activity classification component. The utilization ratio determined at step may correspond to a sparseness prediction with respect to utilization of the requested data storage space.

A portion of the requested size to allocate may be determined. The data storage space allocation component may determine the portion of the request size to allocate based at least in part on the utilization ratio determined. For example, the data storage space allocation component may determine that 40%×2.0 Terabytes=800 Gigabytes should be initially allocated in response to the request. A set of data storage servers may be selected. For example, the data storage space allocation component may select a subset of a pool of available data storage servers such as the data storage server set to maintain a data storage space having the size determined. In addition, the data storage space allocation component may select the set of data storage servers so as to satisfy the sparse provisioning constraints (or customer-associated subset thereof). For example, the provisioning constraints may specify that data storage servers in the data storage server set are each to have an aggregate (with respect to maintained virtual data stores) requested storage space to active storage space ratio of no more than 60%. If each data storage server has a data storage capacity of 12 Terabytes, then, in this example, the provisioning constraints specify that virtual data stores maintained by each data storage server are to have an aggregate requested storage space of no greater than 12 Terabytes/60%=20 Terabytes to ensure that the data storage server set as a whole has the capacity to accommodate activity surges and longer term changes in utilization ratios. The data storage space having the size determined may be allocated at (or "charged to") the set of data storage servers selected. For example, the data storage space allocation component may cause the allocation. The virtual data store requested may be provisioned. When queried, the provisioned virtual data store may report a size corresponding to the requested size. Alternatively, or in addition, the provisioned virtual data store may report the allocated size and indicate that the balance of the request is requested, pending and/or reserved.

In at least one embodiment, the selection of the set of data storage servers may occur subsequent to the virtual data store provisioning. Furthermore, the portion determination and/or the allocation may be incorporated into the selection of the data storage servers in accordance with the provisioning constraints.

In some systems, the system may consider the "sold" capacity (e.g., the amount of resources request and sold to the customer) of server resources, such as bytes, throughput, or IOPS, as well as the actual capacity and usage of the server resources (e.g., the amount of resources the customers are actually using). While conventional systems may make placement decisions based at least primarily on the current sold amount of these resources, these systems could allocate sold bytes to a customer volume until the volume reads or writes that data. Assessing the amount of used resources (e.g., bytes, throughput, IOPS) actually used enables capacity to be oversold for each server, where the amount sold can be based at least in part upon the amount physically used by the volumes on a server instead of the amount that has been sold or allocated. Such an approach comes with the risk, however, that the placement will collocate customer data volumes that will eventually want to use more of their data than is available on a specific server.

Figure 6A:
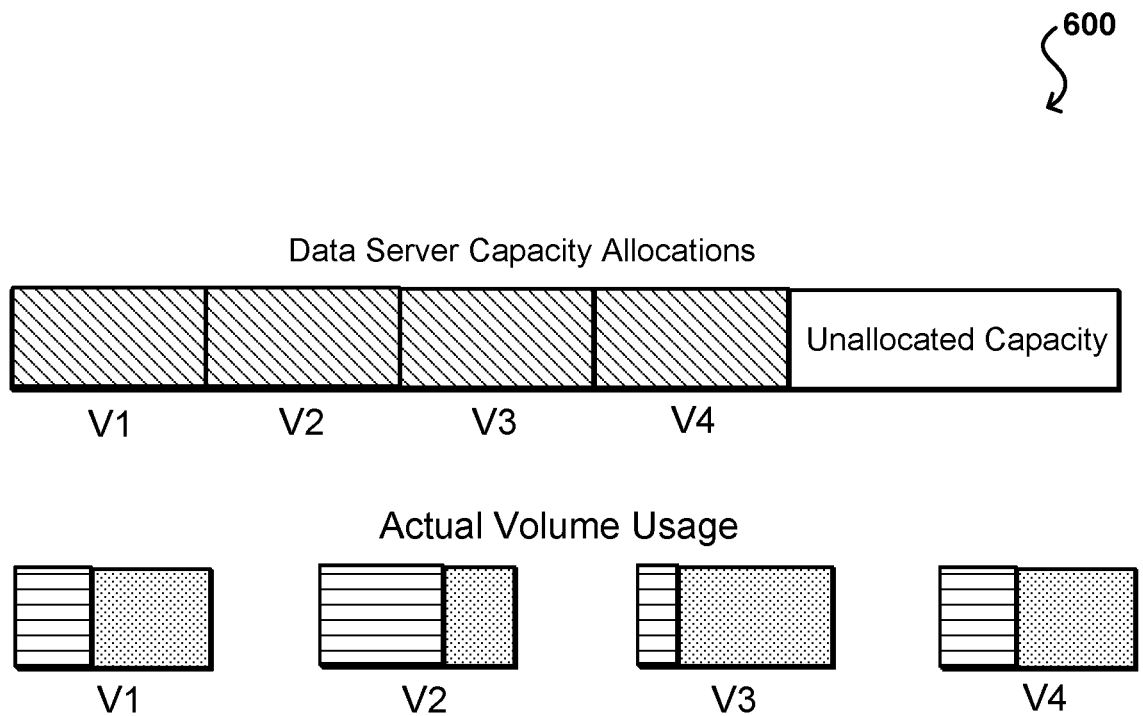
FIGS. 6A, 6B, and 6C illustrate data volume allocations and usage than can be determined using placement algorithms in accordance with various embodiments.
Figure 6B:
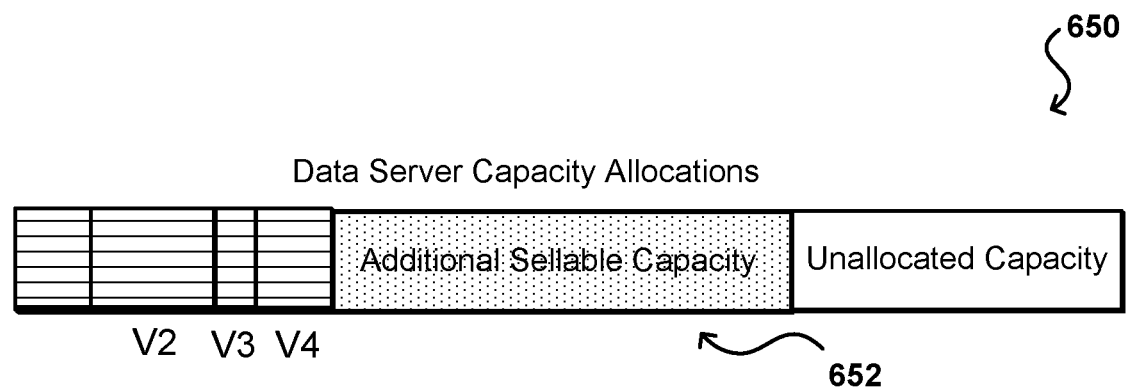

FIG. 6A illustrates an example allocation 600 that can be provided using approaches discussed herein. In this example, four data volumes (or partitions) have been allocated for a particular data server. The elongated bar represents the amount of storage capacity (or other resource capacity) on the server, and the patterned blocks represent data volumes that have been allocated for specific instances or customers. As illustrated, each data volume is approximately the same size, as may correspond to a fixed storage price or package. The purchased allocation occupies around ⅔ of the available storage. As illustrated, however, the actual usage of each volume is significantly less. The usage of the four volumes (V1, V2, V3, V4) is shown below the overall capacity bar in FIG. 6A, showing that on average each partition actually stores less than half the allocated amount of storage. That means that there is at least two volumes' worth of data (in this example) that has been allocated but is not being used. This can result in a significant amount of unused capacity, which requires additional resources to be provided and maintained, driving up prices and costs. In the example allocation 650 of FIG. 6B, however, storage space is provided for the volumes on an as-needed basis. By only allocating the storage space that is actually needed for the respective volumes, a significant amount 652 of additional sellable capacity is made available on the server. Each volume may be able to store up to its allocated amount, but because many volumes will not utilize their respective allocations the unused capacity can instead be used for other customers, for example, which can improve utilization and reduce costs, among other advantages discussed and suggested herein. Such usage will also improve performance of the overall system, as there will be fewer resources to manage that will also require less power and maintenance, among other such advantages.

Figure 6C:
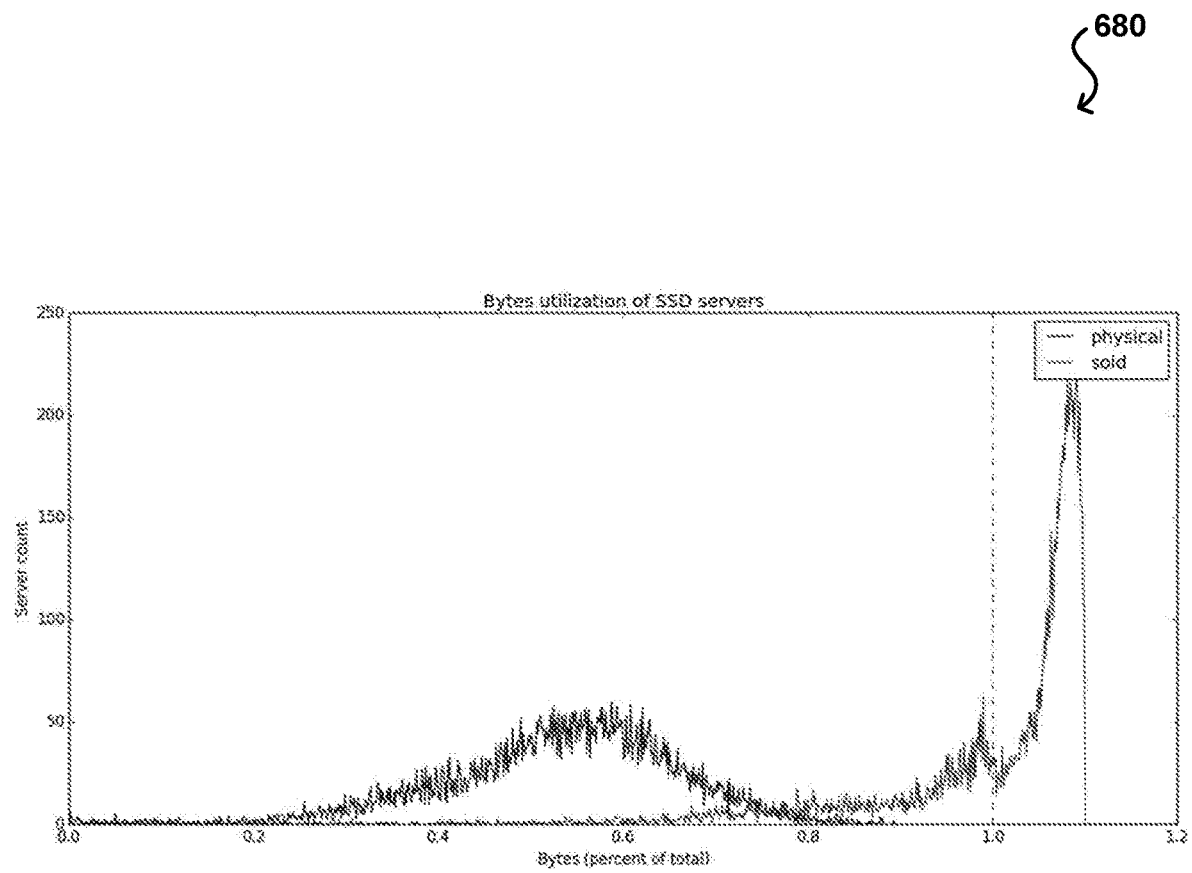

In the graph 680 of FIG. 6C, a plot of the used physical bytes on a set of servers is compared against the sold bytes using a provisioning process discussed herein, where the servers in this example are solid state drive (SSD) data servers. The used physical bytes refer to the bytes consumed on a server to store a partition's active bytes, or types that the customer has referenced at least once. The sold bytes refer to the customer-visible "volume size," or logical address space. Unused customer space does not take up physical bytes. As illustrated, there can be a significant amount of oversold capacity on the servers, since the used physical bytes remain at less than 90% of the existing capacity. Such plots can also be used to determine an appropriate risk threshold, as an amount by which the servers are oversold can correspond to an anticipated amount of actual used physical bytes in at least some embodiments. Models for prediction can take into account other factors as well, such as a zone in which the servers will be operating. Empirical data for that zone can then be used for purposes of the prediction, such as by looking at the average growth rate over time and updating the model.

Accordingly, approaches in accordance with various embodiments can attempt to mitigate this risk by predicting at least the near-term future usage of each volume as well as determining the currently physical utilization of each data volume. By predicting the usage, the customer volumes can be placed (or migrated) more intelligently in order to reduce the risk that the server will run out of physical capacity. In at least some embodiments, a "risk-based" placement model can be used that attempts to determine the risk that a server will soon be constrained with respect to bytes, throughput, or IOPS, for example, instead of simply relying upon which servers have the resources to accept specific volumes. The ability to provision customer volumes in such a way can be related to the effectiveness of the prediction model and the tolerance for the risk, among other such factors. In one embodiment, the predictive model can base the prediction on a variety of factors as may include, for example, customer identifier, whether the volume is a master volume or a slave volume, the type of volume (magnetic, GP2, programmable IOPS volume, etc.), whether the volume is a boot volume or a data volume, whether or not the data volume is attached, the type of attachment, the current utilization of the resource, and the current age of the resource. The model could then produce a set of outputs with predictions for future usage, although a single prediction could also be used in various embodiments. The set of outputs in one example include a predicted utilization in one hour from the current time, six or twelve hours from the current time, one day from the current time, and three days or a week from the current time, although various other time periods can be utilized as well.

As mentioned, previous provisioning services reserved disk space for all the bytes a customer requested, which guaranteed that a server would not run out of physical space. The majority of customers, however, do not use nearly the amount of space that they purchase or reserve. Being able to instead provision resources as writes or other requests occur can significantly reduce the bytes required across the server cluster, fleet, or group to satisfy all customer demand, resulting in significant cost and resource savings for the resource provider, which can be passed along to the customer in the way of reduced pricing. A storage engine can be implemented that enables "on-demand" provisioning of bytes to each volume. A placement service can then leverage this new capability to "overprovision" servers in a way that does not result in significant risk of capacity unavailability. In one embodiment, the physical bytes of each server can be overprovisioned. For example, a placement service can determine that a server has 10 TB of physical space and the service might sell 12 TB of customer volumes on that server based on known or predicted usage patterns of various customers. The amount of overprovisioning can be set at a specific level and adjusted over time as usage patterns change or determinations become more accurate. An active placement component of the service can also scan the fleet periodically (or continually, etc.) to determine when particular servers are getting low on physical capacity. In response, data volumes can be migrated, re-mirrored, or otherwise moved away from that server until at least a minimum amount of capacity is available or another such criteria or target is satisfied.

While such an approach is an improvement over conventional placement systems, it still may not be optimal in at least some cases. For example, such an approach is relatively reactive, in that action may only be taken when a server is near capacity. Accordingly, approaches in accordance with various embodiments can attempt to make more proactive decisions based at least in part upon the predicted usage as discussed above. In some embodiments, a model of byte utilization over time can be built for each partition. Some models can utilize relatively coarse parameters such as sold bytes, volume type, and volume purpose. A server's capacity model then can be treated as an aggregation of the utilization models of all partitions on that server. This provides for a determination of not only the point-in-time capacity picture for the server, but also enables predictions as to how its capacity will change, as well as the "runway" is for the server given the predicted growth rate of its volumes. Using such a model, servers can be overprovisioned by a factor that is tuned for each specific server. Data volumes can also be added or removed proactively before there is an availability risk for the volumes.

Referring back to FIG. 1, a component, system, or service such as a placement manager 112, or placement backend service, can be configured to contact the various data servers 106, or host computing devices, to obtain up-to-date information about the partitions on each server and the capacity for each, both used and sold. This can occur at regular intervals in some embodiments, such as every five minutes in some embodiments. The placement manager 112 can cause this information to be stored for each such scan or sweep, where the information can take the form of one record per partition to indicate sold and used bytes. A statistical analysis process (on the placement manager or otherwise) can consume that data for the past block of time, such as by pulling all the five-minute data from the past week and using that as an input to a model generation process. A model can then be created that can predict future byte utilization from the input set and expose that predicted utilization data in a consumable format. As mentioned, in some embodiments the inputs can include features such as volume type, volume purpose, whether the volume is from snapshot, the sold bytes, the sold IOPS, the current used bytes, and the current age, and the outputs of the model can include the predicted used bytes in an hour, six hours, a day, and three days from the current time. The models themselves can be exposed in various ways. For example, a rigid model structure (i.e., a linear regression) can be used and then the parameters uploaded, while in other examples a service generating the model could expose an API to evaluate the model or preemptively evaluate the model for all partitions and post the raw prediction data, among other such options. The prediction data can then be used for both initial placement decisions as well as decisions about moving or migrating the placements, among other such decisions before or after a data volume or other such resource is provisioned.

Features such as volume age can be useful, as statistics show that volumes of a certain age typically do not grow beyond a certain rate, which can help predict growth of a particular volume. On the other hand, relatively new volumes might be the most likely to grow rapidly. By modeling the growth with volume age, a more accurate prediction can be made. This can be built up on a per-customer, customer type, account type, or other such basis. In a basic approach, a new volume might be initially allocated all the capacity that was purchased, as risk of insufficient capacity could be the highest, and then once a volume reaches a certain age the volume could be assigned a fixed growth percentage (e.g., 5%) over one or more periods of time. In at least some embodiments the growth percentage value can be relatively conservative, particularly for customers or applications without a substantial amount of data for analysis. For customers where there is a lot of data about volume growth, a more accurate prediction can be made based upon the information for other customer volumes, etc. Similarly, if a volume is detached, or otherwise not able to receive I/O, a much lower growth rate can be applied that can also be based at least in part upon the amount of time the volume has been detached. If the volume becomes reattached, a higher growth rate can be applied.

Another feature of use is whether or not the data volume was created from a snapshot. A volume being created from a snapshot provides some guidance as the size of the volume, as least as far as a lower bound. For example, if a 100 GB snapshot is used to create a data volume that currently has about 10 GB of data, there is a reasonable assumption that the server will continue pulling bytes and eventually get to at least 100 GB. Having information about the size of the snapshot as well as the current size of the data volume can thus provide information about the expected growth rate of the volume. Further, volumes created from snapshot tend to be largely read only, so once the volume reaches the expected size it can be reasonable to assume a very low growth rate going forward.

Other features can be valuable in predicting volume growth as well. For example, the type of virtual machine to which the data volume is attached can be a reliable indicator of the anticipated rate of growth. Certain virtual machine types will be more likely to write at high volumes, while certain virtual machine types might have very little I/O at all. Certain other types might write in bursts with very little I/O in-between. These can be good indicators of the amount of growth that can be anticipated for the respective data volumes at various times. In some embodiments the type of volume itself can also be a good indicator of growth, as some types of volumes may be more appropriate for high I/O usage while other types might be more appropriate for volumes that are not expected to change much over time. Further, in some embodiments a customer, application, or other source can cause a tag (e.g., key value pair or metadata) to be applied to a data volume that provides some indication of the expected usage. For data volumes that have been in use for a while, information about the volume and/or patterns of I/O access can also provide information about the anticipated growth of the volume. Trends in I/O can also be utilized in addition to recent amount of I/O, in order to make more accurate predictions in cases where the rate of I/O is significantly increasing or decreasing. Limits on IOPS or other such features can also be included in the predictions, where there is some type of limit bounding the potential growth.

In at least some embodiments, the utilization can be analyzed on a per-partition basis for each sweep of the server utilization data. A determination can be made as to the size of each partition and/or data volume, as well as how much customers are using that physical space. Based on the model features and the utilization data, an expected utilization can be calculated for the various time periods output by the model. In at least some embodiments, the data can be stored for subsequent analysis as well as to refine the model(s) used. In some embodiments the utilization and/or growth rate can be determined based upon whether the volume is a master volume or a slave volume, as reads may not go to some slave volumes, which can affect the I/O received by that volume. So if there is an allocation for the master it can safely be assumed that the I/O for the slave will be less than that allocation. Further, if it is determined that the master volume receives primarily read requests, then the allocation for the slave may be able to be significantly reduced in proportion with the percentage of reads to the master. As mentioned, volume type can be an important feature as well. Certain volume types might be longer lasting and have slower growth rates, while other volume types might only exist for a short duration but have significant use during that duration, or at least a determined portion of that duration. Analysis can be done to determine bounds and/or average growth rate for different volume types. Various limits on utilization can also be considered, as a maximum IOPS allocation can limit the amount of growth of a data volume by a corresponding amount. Many of the features above can also be used to predict bandwidth and IOPS for a particular data volume, as well as other such features as discussed and suggested elsewhere herein.

An important feature, which might be weighted most heavily in at least some embodiments, is the historical growth rate of a customer's volumes, particularly where those volumes are allocated for a specific application or purpose. In some embodiments initial growth rates may be set based at least in part upon a categorization or classification of the associated user, such as whether the user is a fast user or a slow user based upon applying thresholds to previously determined growth rates for that customer. While new volumes can be allocated based upon features such as previous volumes, snapshot size, and determined general bounds that are relatively conservative, volumes with more data can have more dynamic allocation determinations based upon behavior and other such features discussed and suggested elsewhere herein. While the various features can be analyzed independently in some embodiments, various combinations of features can be analyzed using a linear regression model, machine learning algorithm, decision tree algorithm, or other such process to analyze the relative impact of each feature and determine the appropriate weighting of each feature for use in determining the predicted growth rate or allocation.

As mentioned, values such as the predicted utilization and/or growth rate can be used to determine where to place specific volumes in order to ensure that sufficient capacity is available while not taking an unrealistic risk with respect to resource overutilization. Similarly, the growth rate and utilization values can be used to determine when various volumes should be moved to other resources, such as other data servers, in order to ensure sufficient capacity and availability. For example, a threshold amount of capacity may be required on a particular resource in order to minimize the risk that an oversell will affect availability for customer volumes. Accordingly, when a resource is approaching such a threshold based on the partitions or volumes on that resource, one or more of the volumes can be migrated to a different resource or location. The volume(s) selected for migration can depend upon features such as size and growth rate, but can also depend at least in part upon the type of volume or other such features, as a slave volume might have less potential impact during migration than a master volume, and a mature volume with little traffic might preferably be moved over a new volume that is receiving a lot of requests. Various other features can be used for a migration determination as well as discussed and suggested elsewhere herein. Further, in at least some embodiments the volumes can be migrated as the overall predicted growth rate for the volumes on a resource increases, as it can be desirable to limit the growth rate and size to an amount that is less than the bandwidth or capability of moving volumes to another location.

In at least some embodiments an automated process can be utilized that continually, or at least periodically, rebuilds the model from actual data for the volumes. This can include, for example, analyzing the last month of customer growth data and building or refining the predictive model using that data. New model files can be generated and used for the predictions with the most recent data. The models can be used by a placement manager as discussed herein. In some embodiments there may be at least two different placement managers, including one for initial placement and one for migration. In some embodiments the modeling component may be a separate system, component, or service as well.

Figure 7:
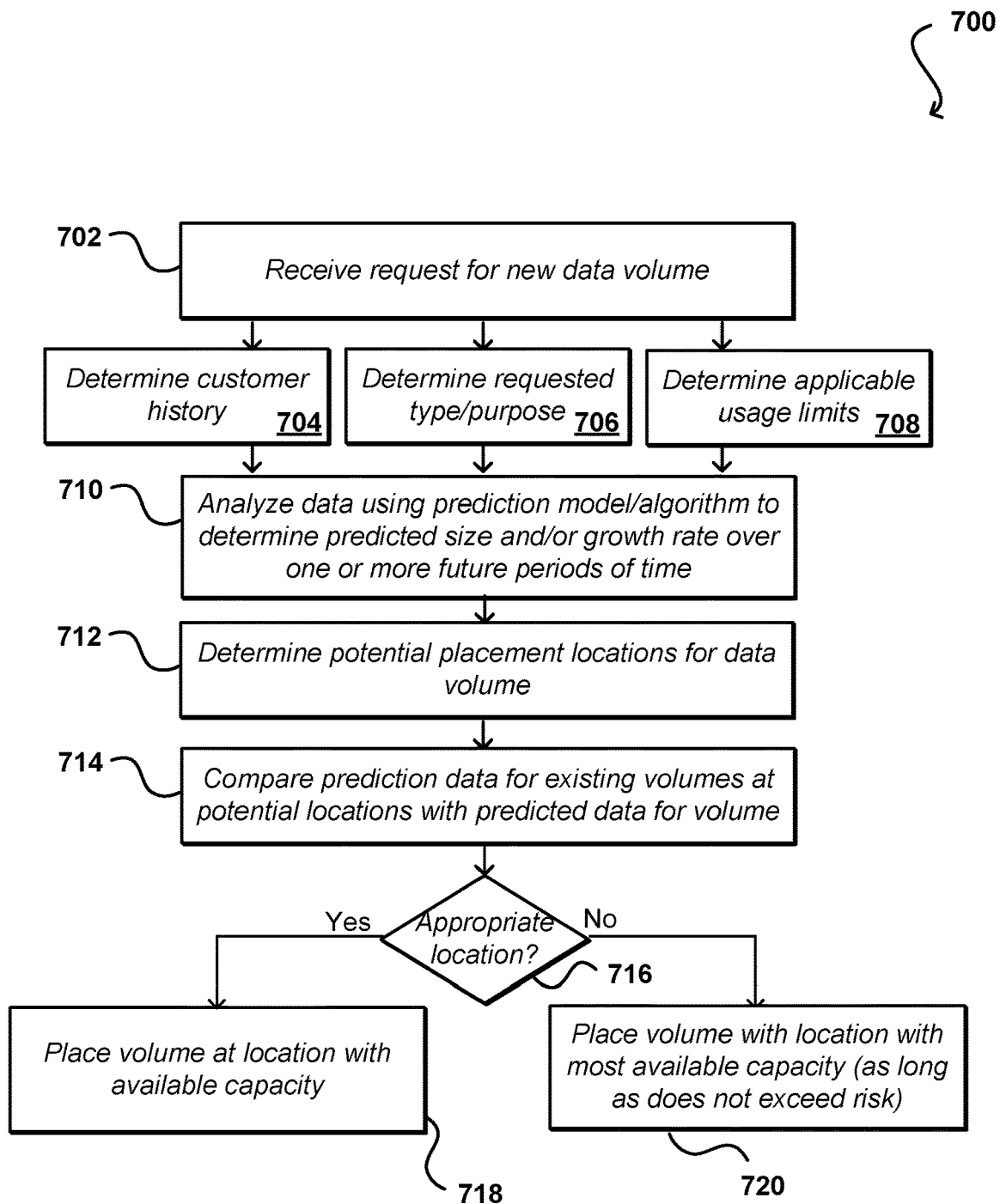
FIG. 7 illustrates an example process for placing data volumes that can be utilized in accordance with various embodiments.

As mentioned, various predictions can be used for both placement and migration of data volumes, partitions, and other such resource allocations within the scope of the various embodiments. FIG. 7 illustrates one example process 700 that can be used to determine appropriate placements based upon such predictions that can be utilized in accordance with various embodiments. As mentioned, some embodiments may provide a specified allocation for new volumes and then provide a fixed growth rate beyond that, or a growth rate that may change over time based upon volume age or other such features. As mentioned elsewhere herein, although the term "volume" is used in many examples presented herein, partitions of a volume can take advantage of various advantages of the various embodiments as well in many cases. The process of FIG. 7, however, uses various determinable data to predict an amount of allocation and/or growth of a requested data volume, over one or more periods of time, in order to determine an appropriate location or resource upon which to place the data volume. In this example, a request is received 702 for a new data volume. The requested data volume can be associated with a customer account, and in some instances can be associated with a respective virtual machine, application, or other such component. Upon receiving the request, an attempt can be made to gather data useful in predicting the utilization and/or growth rate for the requested volume. Although all of the various features discussed herein that can be utilized, in this example information about the customer history can be determined 704. This can include information about volume usage, growth, and other features for past volumes provided to that customer, as well as information about the type of customer, type of account, etc. Information about the requested type of volume and/or purpose for the volume can be determined 706 as well. This can include, for example, the type of data volume, whether the volume will be a master or slave, whether the volume will be generated from a data snapshot, a type of virtual machine instance to which the volume will be attached, an intended use for the volume, and/or other such information. Any applicable usage limits can also be determined 708, such as a maximum guaranteed number or amount of IOPS, bandwidth, or throughput allocated to the customer. Various other types of information can be determined as well within the scope of the various embodiments.

Once the data is gathered, the data can be analyzed 710 using an appropriate prediction model and/or algorithm as discussed herein. Such a model can be used to generate predictions of anticipated utilization and/or growth over one or more periods of time, such as over the next few minutes, next hour, next day, etc. Along with predicting these and/or other such values, a set of potential placement locations for the data volume can be determined 712, such as data servers or data stores having available capacity for new volumes. The predicted values for the new data volume can then be compared 714 against information for the potential locations to determine an appropriate location for the new data volume. This can include, for example, analyzing the current utilization and predicted growth of volumes on the data server and determining whether there is predicted to be sufficient capacity on that data server over some or all of the future periods of time. As discussed elsewhere herein, the current utilization and predicted capacities and/or growth rates for the various servers can be updated over time as well, in order to ensure that the predicted amount of available capacity across the servers remains accurate. A determination can be made 716 as to whether an appropriate location could be found that has the capacity to satisfy the predicted needs of the data volume. If so, the new data volume can be placed 718 on that data server or in that data store that has the available capacity, and the volume can be allocated with an appropriate initial size and growth rate based at least in part upon the predictions. If no volume can be created that can support the predicted utilization and/or growth, the volume can be placed 720 in a location that has the most available capacity, or at least a reasonable amount of capacity, as long as the placement does not exceed any risk tolerance or threshold, etc. Because the predictions will usually be somewhat conservative, it can be possible to slightly oversell in some situations until more capacity becomes available or a more accurate prediction can be made based on additional data.

Figure 8:
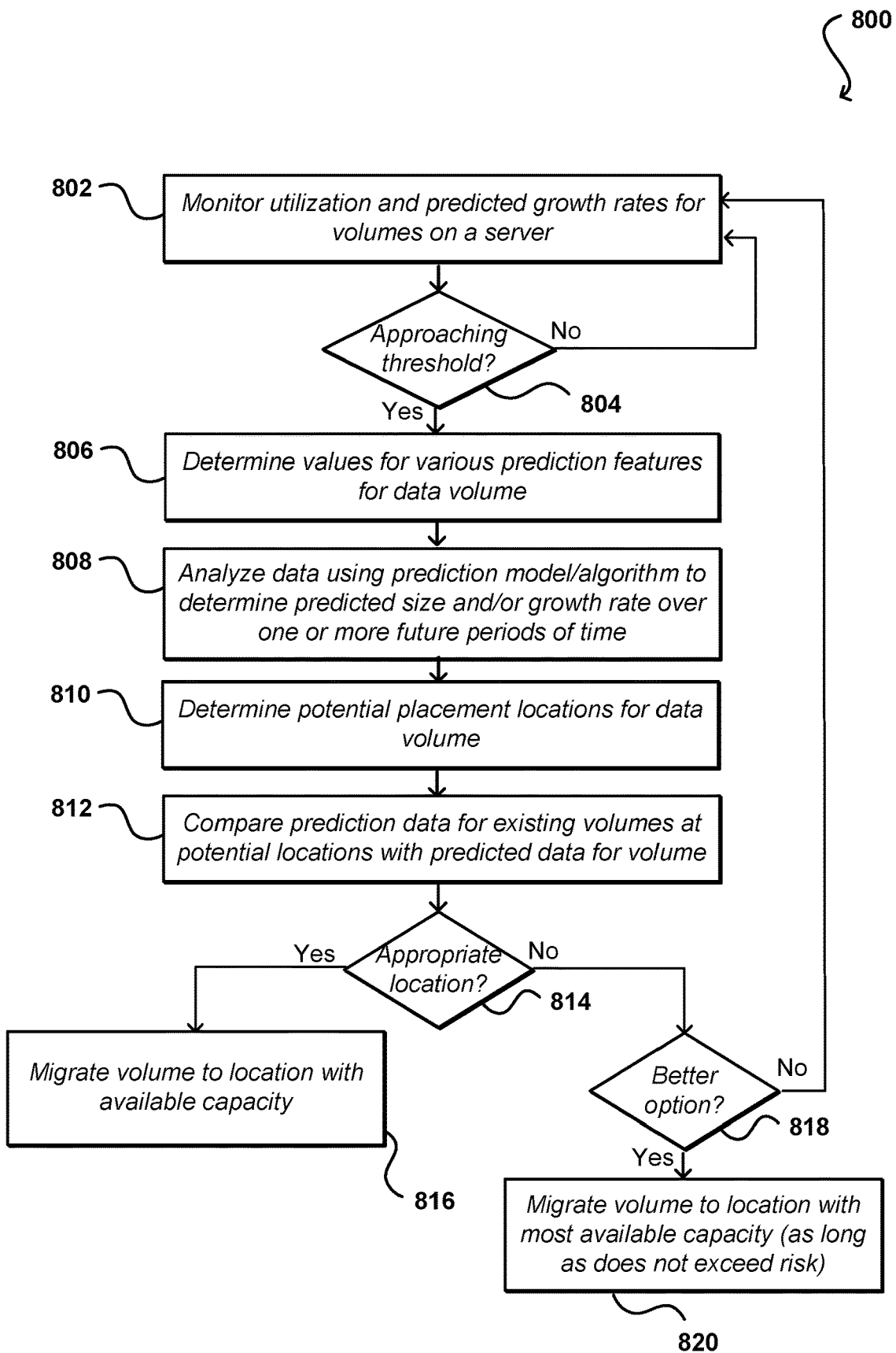
FIG. 8 illustrates an example process for migrating data volumes that can be utilized in accordance with various embodiments.

FIG. 8 illustrates an example process 800 for determining whether to migrate a data volume that can be utilized in accordance with various embodiments. In this example, the utilization and predicted growth of various data volumes (and other such resource allocations) on one or more servers can be monitored 802, such as by scanning the servers every five minutes to determine whether the predicted utilization or growth of volumes on that server will exceed a maximum threshold or is trending toward such a value. If the volumes on a server are determined to not be approaching or exceeding such a threshold, the system can continue to operate with the current placements. If it is determined 804, however, that a particular server has volumes that are approaching at least one threshold, a migration workflow can be initiated to determine which (if any) of the volumes on that server to migrate, as well as locations to which to migrate those volumes. In this example, the values for various prediction features for the data volumes can be determined 806, as may include features such as customer identifier, volume age, volume type, and others discussed or suggested herein. This data can then be analyzed 808 using an appropriate prediction model or algorithm to determine the predicted size and/or growth of those volumes over one or more future periods of time. In some instances this determination would have been done to determine that a migration may be appropriate and those values can be used instead of generating new prediction values, among other such options.

As with the placement of new data volumes, a set of potential placement locations for a data volume can be determined 810, such as data servers or data stores having available capacity for new and/or migrated volumes. The predicted values for the data volume can be compared 812 against information for the potential locations to determine an appropriate location for the new data volume. This can include, for example, analyzing the current utilization and predicted growth of volumes on the data server and determining whether there is predicted to be sufficient capacity on that data server over some or all of the future periods of time. A determination can be made 814 as to whether an appropriate location could be found that has the capacity to satisfy the predicted needs of the data volume. If so, the data volume can be migrated 816 to that data server or data store that has the available capacity, and the volume can be allocated with an appropriate size and growth rate based at least in part upon the predictions. If no volume can be created that can support the predicted utilization and/or growth, another determination can be made 818 as to whether one of the potential locations is a better option for the data volume, such as by having more available capacity or less risk of running out of capacity. If not, the data volume can be left in its current location. If there is determined to be a better option, however, the volume can be migrated 720 to the location that is determined to be the better option. Due to the amount of overhead and delay in moving the data volume, there may be minimum amounts or thresholds of improvement required before the data volume is moved to the new location. As mentioned, since predictions may often be relatively conservative, it can be possible to slightly oversell in some situations until more capacity becomes available or a more accurate prediction can be made based on additional data.

Figure 9:
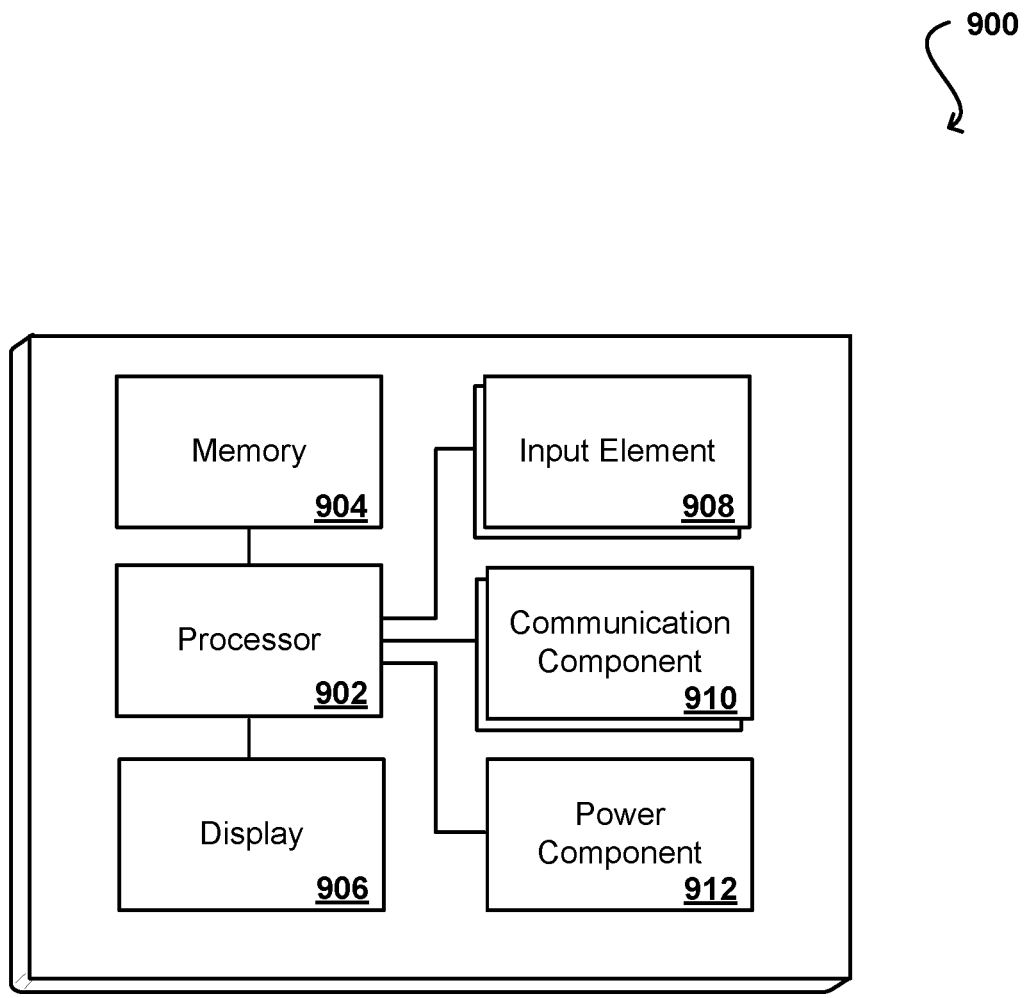
FIG. 9 illustrates components of an example computing device that can be used to perform aspects of the various embodiments.

FIG. 9 illustrates a logical arrangement of a set of general components of an example computing device 900. In this example, the device includes a processor 902 for executing instructions that can be stored in a memory device or element 904. As would be apparent to one of ordinary skill in the art, the device can include many types of memory, data storage, or non-transitory computer-readable storage media, such as a first data storage for program instructions for execution by the processor 902, a separate storage for images or data, a removable memory for sharing information with other devices, etc. The device typically will include some type of display element 906, such as a touch screen or liquid crystal display (LCD), although devices such as portable media players might convey information via other means, such as through audio speakers. As discussed, the device in many embodiments will include at least one input element 908 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 900 of FIG. 9 can include one or more network interface or communication elements or components 910 for communicating over various networks, such as a Wi-Fi, Bluetooth, RF, wired, or wireless communication systems. The device in many embodiments can communicate with a network, such as the Internet, and may be able to communicate with other such devices. The device will also include one or more power components 912, such as power cords, power ports, batteries, wirelessly powered or rechargeable receivers, and the like.

Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices used to interact with various embodiments can include any appropriate device operable to send and receive requests, messages, or information over an appropriate network and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

It should be understood that there can be several application servers, layers, or other elements, processes, or components, which may be chained or otherwise configured, which can interact to perform tasks as discussed and suggested herein. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

A data store can include several separate data tables, databases, or other data storage mechanisms and media for storing data relating to a particular aspect. The data store is operable, through logic associated therewith, to receive instructions from a server, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server, and typically will include a non-transitory computer-readable medium storing instructions that, when executed by a processor of the server, allow the server to perform its intended functions.

Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are described. Thus, the depictions of various systems and services herein should be taken as being illustrative in nature, and not limiting to the scope of the disclosure.

Various aspects can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, at a placement manager of a resource provider environment, a request for a storage volume to be associated with a customer account, the request indicating a type of virtual machine instance to which the storage volume will be attached;
determining historical usage data, for storage volumes previously associated with the customer account, the historical usage data including utilization data and growth data;

determining volume information indicating a type and an expected use for each storage volume of the storage volumes previously associated with the customer account;

analyzing the historical usage data and the volume information using at least one prediction model to determine predicted utilization and growth rate data for each of a set of future periods of time, the predicted utilization and growth rate data based at least in part on the type of virtual machine instance;

determining, for each respective resource of a set of resources capable of hosting the storage volume, a predicted capacity over at least a subset of the set of future periods of time based at least in part on an age of one or more existing volumes hosted by the respective resource;

determining, based at least in part upon comparing the predicted utilization and growth rate data for the storage volume to the predicted capacity for at least a subset of the set of resources, a selected resource on which to place the storage volume, the selected resource predicted to have sufficient capacity to support the predicted utilization and growth rate data for the storage volume over at least the subset of future periods of time; and placing the storage volume on the selected resource.

2. The computer-implemented method of claim 1, further comprising:

determining a risk tolerance corresponding to storage capacity of the selected resource; and allocating storage space on the selected resource based on a combination of the predicted utilization and the predicted growth rate for the storage volume along with the risk tolerance for the selected resource.

3. The computer-implemented method of claim 1, further comprising:

periodically determining current utilization data for each of a set of storage volumes placed on the selected resource;

analyzing the current utilization data for the set of storage volumes using the at least one prediction model to determine current predicted utilization data and current growth rate data for each of the storage volumes over each of the set of future periods of time; and migrating a subset of the set of storage volumes to a different resource if at least one of the current predicted utilization data or the current growth rate data indicates that the selected resource will have insufficient capacity in at least one of the future periods of time.

4. The computer-implemented method of claim 3, further comprising:

determining a second set of potential resources to host the subset of storage volumes;

determining a respective predicted available capacity for each of the second set of potential resources; and selecting the different resource from the second set of potential resources in response to the predicted available capacity for the different resource being able to support the subset of storage volumes based at least in part upon the current predicted utilization data and current growth rate data for the subset of storage volumes.

5. A computer-implemented method, comprising:

determining to create a customer volume in a resource environment, the customer volume associated with a first type of virtual machine instance;

determining, based at least in part upon the first type of virtual machine instance and historical utilization and growth data for a customer associated with the customer volume, a predicted utilization and a predicted growth rate for the customer volume over one or more future periods of time;

determining a selected resource, of a plurality of electronic resources of the resource environment, predicted to have sufficient capacity to support the customer volume over the one or more future periods of time based at least in part upon the predicted utilization for the customer volume, the predicted growth rate for the customer volume, and a predicted growth rate for existing customer volumes on the selected resource determined based at least in part on ages of the existing customer volumes; and creating the customer volume on the selected resource, the resource capable of supporting multiple customer volumes using an available capacity of the selected resource.

6. The computer-implemented method of claim 5, further comprising:

predicting capacity of at least a subset of the plurality of electronic resources based at least in part upon a current utilization of customer volumes on each electronic resource and an overall growth prediction for the customer volumes on the electronic resource.

7. The computer-implemented method of claim 5, wherein the sufficient capacity includes at least one of a number of available bytes, an amount of available input/output operations per second (IOPS), or an amount of available throughput of the selected resource.

8. The computer-implemented method of claim 5, wherein the customer volume is a data volume, and wherein the at least one of the predicted utilization or the predicted growth rate is determined based upon an attachment to a virtual machine.

9. The computer-implemented method of claim 5, further comprising:

periodically determining current utilization data for the customer volume;

analyzing the current utilization data using at least one prediction model to determine current predicted utilization data and current growth rate data for each of the one or more future periods of time; and migrating the customer volume to a different resource if at least one of the current predicted utilization data, the current growth rate data, or a predicted growth rate for existing customer volumes on the selected resource indicates that the selected resource will run out of capacity over at least one of the future periods of time.

10. The computer-implemented method of claim 9, further comprising:

determining a respective predicted available capacity for at least a subset of the plurality of electronic resources; and selecting the different resource to host the customer volume in response to the predicted available capacity for the different resource being able to support the customer volume based at least in part upon the current predicted utilization data and current growth rate data for the customer volume.

11. The computer-implemented method of claim 10, wherein determining a predicted utilization or a predicted growth rate for the customer volume comprises analyzing additional data using the at least one prediction model, the additional data including at least one of customer volume type, a master or slave designation, an intended purpose for the customer volume, whether the customer volume is being created from a snapshot, or an age of the customer volume.

12. The computer-implemented method of claim 5, further comprising:
   determining whether capacity for the selected resource is sufficient capacity based at least in part upon a risk threshold associated with a type of the selected resource, the risk threshold corresponding to a probability of the selected resource running out of capacity based at least in part upon predicted utilization and growth rate values for customer volumes placed on the selected resource.

13. The computer-implemented method of claim 5, wherein the one or more future periods of time include at least one of a next hour, a next number of hours, a next day, or a next number of days.

14. The computer-implemented method of claim 6, wherein predicting storage capacities for at least the subset of the plurality of electronic resources comprises building a separate prediction model for each of a plurality of customer volumes hosted by the plurality of electronic resources of the resource environment.

15. A system, comprising:
   at least one processor; and
   memory including instructions that, upon being executed by the at least one processor, cause the system to:
      receive an instruction to create a customer volume in a resource environment, the customer volume associated with a first type of virtual machine instance;
      determine, based at least in part upon the first type of virtual machine instance and historical utilization and growth data for a customer associated with the customer volume, a predicted utilization and a predicted growth rate for at least a portion of the customer volume over one or more future periods of time;
      determine a selected resource, of a plurality of electronic resources of the resource environment, predicted to have sufficient capacity to support the portion of the customer volume over the one or more future periods of time based at least in part upon the predicted utilization for the portion of customer volume, the predicted growth rate for the portion of customer volume, and a predicted growth rate for existing customer volumes on the selected resource determined based at least in part on ages of the existing customer volumes; and
      create the portion of the customer volume on the selected resource, the resource capable of supporting multiple customer volumes using an available capacity of the selected resource.

16. The system of claim 15, wherein the instructions when executed further cause the system to:
   determine at least one of the predicted utilization or the predicted growth rate based in part on analyzing at least one of the customer volume type, a master or slave designation, an intended purpose for the customer volume, whether the customer volume is being created from a snapshot, or an age of the customer volume.

17. The system of claim 15, wherein the instructions when executed further cause the system to:
   predict capacity of at least a subset of the plurality of electronic resources based at least in part upon a current utilization of customer volumes on each electronic resource and an overall growth prediction for the customer volumes on the electronic resource.

18. The system of claim 15, wherein the instructions when executed further cause the system to:
   periodically determine current utilization data for the customer volume;
   analyze the current utilization data using at least one prediction model to determine current predicted utilization data and current growth rate data for each of the one or more future periods of time; and
   migrate the customer volume to a different resource if at least one of the current predicted utilization data or the current growth rate data indicates that the selected resource will run out of available capacity over at least one of the future periods of time.

19. The system of claim 15, wherein the instructions when executed further cause the system to:
   determine a respective predicted available capacity for at least a subset of the plurality of electronic resources; and
   select the different resource to host the customer volume in response to the predicted available capacity for the different resource being able to support the customer volume based at least in part upon the current predicted utilization data and current growth rate data for the customer volume.

* * * * *